United States Patent
Namuduri et al.

(10) Patent No.: US 10,480,476 B2
(45) Date of Patent: Nov. 19, 2019

(54) STARTER SYSTEM AND METHOD OF CONTROL

(71) Applicant: GM Global Technology Operations LLC, Detroit, MI (US)

(72) Inventors: Chandra S. Namuduri, Troy, MI (US); Thomas W. Nehl, Shelby Township, MI (US); Lei Hao, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 15/961,204

(22) Filed: Apr. 24, 2018

(65) Prior Publication Data

US 2019/0323470 A1 Oct. 24, 2019

(51) Int. Cl.
*F02N 11/08* (2006.01)

(52) U.S. Cl.
CPC ...... *F02N 11/0818* (2013.01); *F02N 11/0811* (2013.01); *F02N 11/0851* (2013.01); *F02N 11/0862* (2013.01); *F02N 2200/022* (2013.01); *F02N 2300/104* (2013.01); *F02N 2300/2011* (2013.01)

(58) Field of Classification Search
CPC ............. F02N 11/0818; F02N 11/0851; F02N 11/0811; F02N 11/0862; F02N 2300/2011; F02N 2200/022; F02N 2300/104
See application file for complete search history.

(56) References Cited

U.S. PATENT DOCUMENTS

| | | |
|---|---|---|
| 5,151,017 A | 9/1992 | Sears et al. |
| 6,034,459 A | 3/2000 | Matsunobu et al. |
| 7,116,065 B2 | 10/2006 | Wakitani et al. |

(Continued)

FOREIGN PATENT DOCUMENTS

| | | |
|---|---|---|
| CN | 2711983 Y | 7/2005 |
| CN | 101487434 A | 7/2009 |

(Continued)

OTHER PUBLICATIONS

Lei Hao et al., Utility U.S. Appl. No. 15/961,176, filed Apr. 24, 2018.

(Continued)

*Primary Examiner* — Xiao En Mo
(74) *Attorney, Agent, or Firm* — Quinn IP Law

(57) ABSTRACT

A starter system includes a brushless electric starter motor and a battery power pack, the motor operatively connectable to an internal combustion engine of a powertrain. A power inverter converts direct current provided from the battery power pack to multi-phase alternating current to drive the motor. A pinion gear with one-way clutch is rotatably driven by the motor and movable between a disengaged position and an engaged position in which the pinion gear is meshingly engaged with a ring gear operatively connected to a crankshaft of the engine. A solenoid is operatively connected to the pinion gear. An electronic control system controls the motor to crank the engine using power provided from the battery power pack, and to separately command the solenoid to a disabled or an enabled state. A method of controlling the starter system controls the motor to crank the engine in a restart following an autostop.

18 Claims, 3 Drawing Sheets

(56) References Cited

U.S. PATENT DOCUMENTS

| | | |
|---|---|---|
| 8,427,139 B2 | 4/2013 | Malik et al. |
| 9,121,380 B2 | 9/2015 | Fulton |
| 9,567,922 B2 | 2/2017 | Lofgren |
| 10,184,442 B2 | 1/2019 | Hao et al. |
| 2001/0039230 A1 | 11/2001 | Severinsky et al. |
| 2002/0153796 A1 | 10/2002 | Yoshinaga et al. |
| 2003/0048024 A1 | 3/2003 | Chu |
| 2003/0183430 A1 | 10/2003 | Naito et al. |
| 2003/0189375 A1 | 10/2003 | Raad |
| 2005/0099155 A1 | 5/2005 | Okuda et al. |
| 2005/0140235 A1 | 6/2005 | Yamagishi et al. |
| 2005/0236246 A1 | 10/2005 | Joki |
| 2007/0007057 A1 | 1/2007 | Fujino et al. |
| 2007/0018522 A1 | 1/2007 | Ackva et al. |
| 2008/0012445 A1 | 1/2008 | Abe et al. |
| 2008/0079389 A1 | 4/2008 | Howell et al. |
| 2008/0193275 A1 | 8/2008 | De Filippis et al. |
| 2008/0203846 A1 | 8/2008 | Hoemann et al. |
| 2009/0085418 A1 | 4/2009 | Kobayashi et al. |
| 2009/0107443 A1* | 4/2009 | Sarbacker ............ F02N 11/0862 123/179.28 |
| 2009/0179518 A1 | 7/2009 | Tajima et al. |
| 2009/0206660 A1 | 8/2009 | Makita et al. |
| 2010/0001523 A1 | 1/2010 | Sato et al. |
| 2010/0300646 A1 | 12/2010 | Sawaguchi et al. |
| 2011/0009235 A1 | 1/2011 | Song et al. |
| 2011/0267851 A1 | 11/2011 | Nagel et al. |
| 2012/0025601 A1 | 2/2012 | Nefcy et al. |
| 2012/0053011 A1 | 3/2012 | Onomura et al. |
| 2012/0126614 A1 | 5/2012 | Inoue et al. |
| 2012/0206109 A1 | 8/2012 | Fassnacht et al. |
| 2012/0247846 A1 | 10/2012 | Ichikawa |
| 2013/0038271 A1 | 2/2013 | Park |
| 2013/0046435 A1 | 2/2013 | Shin et al. |
| 2013/0106219 A1 | 5/2013 | Schneider et al. |
| 2013/0138328 A1 | 5/2013 | Shimo et al. |
| 2013/0154397 A1 | 6/2013 | Sullivan |
| 2013/0300371 A1 | 11/2013 | Bills |
| 2014/0015364 A1 | 1/2014 | Iwatsu et al. |
| 2014/0260792 A1* | 9/2014 | Bradfield ............ F02N 11/0855 74/7 A |
| 2014/0292073 A1 | 10/2014 | Zhang et al. |
| 2015/0051821 A1 | 2/2015 | Presot |
| 2015/0105949 A1 | 4/2015 | Wright et al. |
| 2015/0112536 A1 | 4/2015 | Severinsky et al. |
| 2015/0211469 A1 | 7/2015 | Ghoneim et al. |
| 2015/0224845 A1 | 8/2015 | Anderson et al. |
| 2015/0239334 A1 | 8/2015 | El Baraka et al. |
| 2015/0258946 A1 | 9/2015 | Namuduri et al. |
| 2015/0283964 A1 | 10/2015 | Janarthanam |
| 2015/0295459 A1 | 10/2015 | Hao et al. |
| 2015/0303750 A1 | 10/2015 | Bouarroudj et al. |
| 2015/0361941 A1 | 12/2015 | Du et al. |
| 2016/0006311 A1 | 1/2016 | Li |
| 2016/0032880 A1 | 2/2016 | Lovett et al. |
| 2016/0046281 A1* | 2/2016 | Nedorezov ......... F02N 11/0851 701/22 |
| 2016/0056684 A1 | 2/2016 | Nemoto et al. |
| 2016/0290304 A1 | 10/2016 | Yukawa et al. |
| 2017/0082012 A1 | 3/2017 | Jang |
| 2017/0152828 A1* | 6/2017 | Bradfield ............ F02N 11/0851 |
| 2017/0327106 A1 | 11/2017 | Johri et al. |
| 2017/0334297 A1 | 11/2017 | Hao et al. |
| 2017/0334422 A1 | 11/2017 | Namuduri et al. |
| 2017/0338706 A1 | 11/2017 | Hao et al. |
| 2018/0030944 A1 | 2/2018 | Raad |
| 2018/0258900 A1 | 9/2018 | Namuduri et al. |

FOREIGN PATENT DOCUMENTS

| | | |
|---|---|---|
| CN | 102025248 A | 4/2011 |
| CN | 102923124 A | 2/2013 |
| DE | 102008040830 A1 | 2/2010 |
| DE | 102011056431 A1 | 6/2013 |
| EP | 0619427 B1 | 10/1994 |
| JP | 2000104650 A | 4/2000 |
| JP | 2003148317 A | 5/2003 |

OTHER PUBLICATIONS

Quanbao Zhou, John Houldcroft, "Cold engine cranking torque requirement analysis," SAE International Inc., 2007, JSAE 20077002.

Hao et al., Utility U.S. Appl. No. 15/417,734, filed Jan. 27, 2017.

Namuduri et al., Utility U.S. Appl. No. 15/452,312, filed Mar. 7, 2017.

Hao et al., Utility U.S. Appl. No. 15/811,740, filed Nov. 14, 2017.

Namuduri et al., Utility U.S. Appl. No. 15/961,198, filed Apr. 24, 2018.

* cited by examiner

STARTER SYSTEM AND METHOD OF CONTROL

The present disclosure relates to a starter system such as for a powertrain, and to a method of controlling the starter system.

In an effort to improve fuel economy, many vehicles include an engine autostop event that occurs during a vehicle drive mode under certain conditions when propulsive torque is not required, such as when the vehicle is stopped at a stoplight, or when coasting on a highway. In powertrain design, weight, available packaging space, and efficiency of components are considerations.

SUMMARY

In the present disclosure, a starter system for a powertrain uses a brushless electric starter motor. A method for controlling a starter system to provide engine autostarts with a brushless electric starter motor is also disclosed.

The brushless electric starter motor may provide advantages such as a long life-cycle, a relatively low inertia, and consistent and quick engine starts and restarts without a noticeable voltage dip. For example, a brushless electric starter motor may obtain a predefined engine crankshaft rotational speed, such as 500 rpm, in a quicker period than a brush-type starter motor, with a lower inertia and the ability to fit within the same packaging space as a brush-type starter motor (i.e., without increase in size).

Current draw of a brushless electric starter motor may be advantageous because the peak current drawn by the brushless electric starter motor during cranking may be significantly lower than brushed starter motor configurations. The improved current draw performance reduces any voltage dip across the power bus used to power the motor during cranking, eliminating the need for supplemental power boosting during cranking.

A starter system for a powertrain disclosed herein includes a brushless electric starter motor selectively operatively connectable to an internal combustion engine included in the powertrain. The starter system includes a battery power pack, and a power inverter operable to convert direct current provided from the battery power pack to multi-phase alternating current to drive the brushless electric starter motor. The powertrain includes a ring gear that is operatively connected to a crankshaft of the internal combustion engine. The starter system includes a pinion gear is configured to be rotatably driven by the brushless electric starter motor and movable between a disengaged position in which the pinion gear is disengaged from the ring gear, and an engaged position in which the pinion gear is meshingly engaged with the ring gear to transfer torque provided from the brushless electric starter motor to the crankshaft. The starter system includes a solenoid operatively connected to the pinion gear, and further includes an electronic control system that is operable to control the brushless electric starter motor to crank the internal combustion engine using power provided from the battery power pack through the power inverter, and to separately command the solenoid to a disabled state and alternately to an enabled state. The pinion gear moves to the disengaged position when the solenoid is in the disabled state, and moves to the engaged position when the solenoid is in the enabled state.

In an aspect of the disclosure, the electronic control system includes a powertrain controller and a motor controller. The powertrain controller is configured to command the motor controller to energize the brushless electric starter motor using power from the battery power pack through the power inverter, and to separately command the solenoid to the enabled state to engage the pinion gear.

In an aspect of the disclosure, a power bus may connect the battery power pack to the power inverter and the brushless electric starter motor, and also connect the battery power pack to vehicle electrical loads. Stated differently, the battery power pack and the brushless electric starter motor are on the same power bus, which may be a nominal 12 Volt power bus. For this reason, the starter system and the vehicle powertrain may be characterized by the absence of a DC-DC converter operatively connecting the battery power pack to the power inverter.

In an aspect of the disclosure, the battery power pack may be the only electrical power source for supplying electrical power to the powertrain. In other words, the powertrain may be a non-hybrid powertrain.

In an aspect of the disclosure, the electronic control system is configured to determine engine speed of the internal combustion engine, wherein the engine speed is the rotational speed of the crankshaft. During a drive mode following an engine autostop event and only if the engine speed is less than or equal to a predetermined cranking cutoff speed (N2), the electronic control system enables the brushless electric starter motor to crank the internal combustion engine using power provided from the battery power pack. When the engine speed is greater than the predetermined cranking cutoff speed (N2), the engine does not need to be cranked to accomplish the restart event. Instead, fuel and spark are simply enabled. In this situation, enablement of the brushless electric starter motor is not commanded.

For example, in an aspect of the disclosure, only if engine speed is less than a first predetermined speed threshold (N1) that is less than the cranking cutoff speed (N2), the electronic control system may be configured to both: (i) command the solenoid to an enabled state to move the pinion gear into engagement with the engine ring gear, and (ii) after commanding the solenoid to the enabled state, enable the brushless electric starter motor to crank the internal combustion engine during the drive mode following the engine autostop event. The first predetermined speed threshold is less than the cranking cutoff speed (N2). In another aspect, the electronic control system may set a timer for a predetermined period of time after commanding the solenoid to the enabled state. The enabling of the brushless electric starter motor may be upon expiration of the predetermined period of time. Additionally, after commanding the solenoid to the enabled state to move the pinion gear into engagement with the engine ring gear and enabling the brushless electric starter motor to crank the engine, and only if the engine speed is greater than the predetermined cranking cutoff speed (N2), the electronic control system is configured to enable fuel and spark to restart the engine.

In an aspect of the disclosure, when the engine speed is greater the first predetermined speed threshold (N1) and less than or equal to the predetermined cranking cutoff speed (N2), the electronic control system may be configured to both: (i) enable the brushless electric starter motor with a preset torque limit; and (ii) after enabling the brushless electric starter motor, command the solenoid to the enabled state to move the pinion gear into engagement with the engine ring gear to crank the engine. The electronic control system may be configured to set a timer and wait until a predetermined period of time has elapsed after enabling the brushless electric starter motor and before commanding the solenoid to the enabled state. Additionally, after enabling the brushless electric starter motor and commanding the solenoid to the enabled state, the electronic control system may be configured to both: (i) determine whether the engine speed is greater than the predetermined cranking cutoff speed (N2), and (ii) enable fuel and spark to restart the engine only if the engine speed is greater than the predetermined cranking cutoff speed (N2).

In an aspect of the disclosure, after enabling fuel and spark to restart the engine, the electronic control system may be configured to: monitor one or more engine operating parameters; determine when the one or more engine operating parameters meet one or more predefined values indicative of a complete engine start; cease energizing of the brushless electric starter motor when the one or more engine operating parameters meet the predefined values. If the restart event includes enabling the solenoid, the electronic control system may also command the solenoid to the disabled state to disengage the pinion gear from the engine ring gear when the one or more engine operating parameters meet the one or more predefined values.

A method of controlling a starter system for a powertrain is disclosed herein and includes, during a drive mode and following an engine autostop event, receiving, via an electronic control system, vehicle operating parameters satisfying one or more preset initial conditions for an engine restart event. The powertrain includes an internal combustion engine, and an engine ring gear connected with a crankshaft of the internal combustion engine. The starter system includes a brushless electric starter motor selectively operatively connectable to the internal combustion engine, a battery power pack, a solenoid, a pinion gear that may be slidable, and may include a one-way clutch connecting a shaft of the brushless electric starter motor to the pinion gear. The method further includes determining, via the electronic control system, an engine speed, wherein the engine speed is a rotational speed of the crankshaft, and controlling the brushless electric starter motor to crank the internal combustion engine using power provided from the battery power pack only if the engine speed is less than a predetermined cranking cutoff speed (N2).

The above features and advantages and other features and advantages of the present disclosure are readily apparent from the following detailed description of the best modes for carrying out the disclosure when taken in connection with the accompanying drawings.

DETAILED DESCRIPTION

Figure 1:
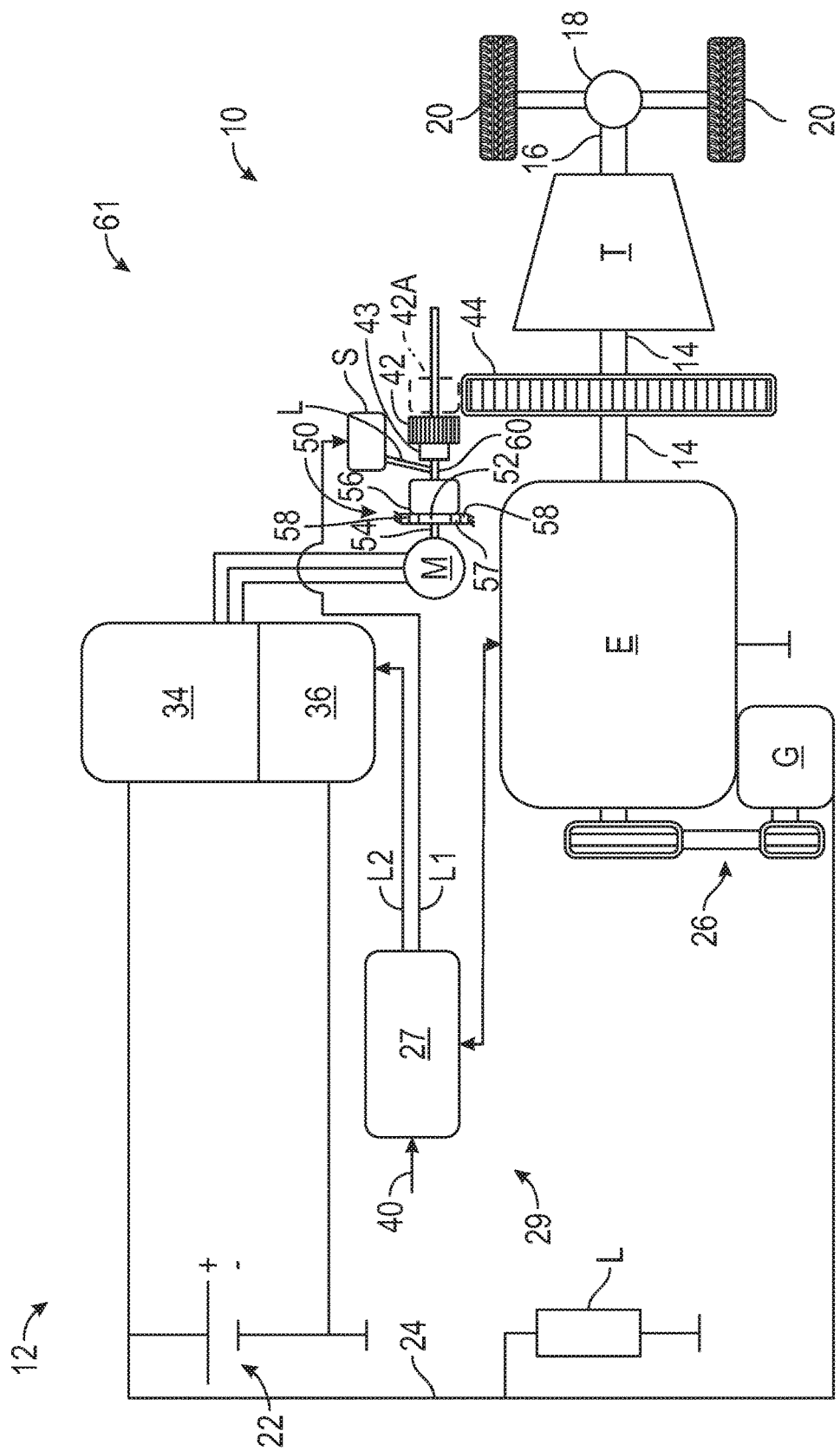
FIG. 1 is a schematic illustration of a vehicle including a powertrain having an internal combustion engine, and a starter system having a brushless electric starter motor and a battery power pack.

Referring to the drawings, wherein like reference numbers refer to like components throughout the views, FIG. 1 shows a vehicle 10 that includes a powertrain 12. The powertrain 12 has an internal combustion engine E as the sole source of propulsion. However, features of the powertrain 12 and a method 100 of controlling a starter system 61 of the vehicle powertrain 12 discussed herein could also be used on a hybrid vehicle that has additional sources of propulsion.

The internal combustion engine E uses fuel that is provided to cylinders of the engine E and is combusted when a spark is introduced in the cylinders to drive a crankshaft 14 of the engine E to propel the vehicle 10. A transmission T has an input member driven by the crankshaft 14, and a plurality of intermeshing gears and torque-transmitting mechanisms (such as selectively engageable or fixed clutches and brakes) that allow for multiple speed ratios through the transmission T from the crankshaft 14 to an output member 16. The output member 16 is connected though a differential 18 and possibly additional ratio-changing components, such as a final drive, to vehicle wheels 20. Only one set of vehicle wheels 20 is shown for purposes of illustrating the features of the disclosure, but the vehicle 10 has two sets of wheels. The other set of wheels may or may not be driven by the transmission T.

The powertrain 12 includes a starter system 61 with a brushless electric starter motor M that is used to start the engine E from a cold start, and to restart the engine E following an autostop during a drive mode of the vehicle 10. The brushless electric starter motor M is the only starter motor provided on the vehicle 10. In fact, the vehicle 10 does not include another electric motor used for starting the engine E or for vehicle propulsion. The engine E is the sole powerplant used for propulsion. However, in other embodiments, another electric motor could be included and used for propulsion in various operating modes, such as in an embodiment that is a hybrid electric vehicle.

The brushless electric starter motor M is configured as a 12 Volt motor but with a higher power than a standard 12 Volt motor sometimes used on vehicles for engine starts. For example, in the embodiment shown, the power of the brushless electric starter motor M may be approximately 1 kilowatt greater than a brush-type motor of a similar size. Brush-type motors may also be referred to herein as brush motors or brushed motors. Brushless electric starter motors are advantageous as they may have a longer life-cycle, and may provide more consistent and quicker engine starts in comparison to other types of motors, including brush-type motors of a comparable size. In various configurations, the brushless electric starter motor M may be a switched reluctance motor, an interior permanent magnet motor, or another brushless motor of sufficient power to start and restart the engine E while being of a relatively small size (diameter and length) to fit within a packaging space of a brush-type starter motor of a lower power.

The starter system 61 includes a battery power pack 22 comprised of one or more battery cells and having a nominal voltage of 12 Volts. The battery power pack 22 is made up of one or more battery cells that provide electrical power as a result of a chemical reaction. The battery power pack 22 is the only electrical power source for supplying electrical power to the vehicle powertrain 12. The battery power pack 22 supplies power at 12 Volts to vehicle electrical loads L along a 12 Volt power bus 24, also referred to as the low voltage power bus. The power bus 24 connects the battery power pack 22 to the power inverter 34 and the brushless electric starter motor M, and also connects the battery power pack 22 to vehicle electrical loads L. In other words, these components are all operatively connected on the same relatively low voltage power bus 24.

The powertrain 12 also includes a generator G rotatably driven by the engine crankshaft 14 via a belt and pulley arrangement 26. The generator G is controlled by a powertrain controller 27 included in the electronic control system 29 described herein to convert torque of the crankshaft 14 into electrical power that is provided to the battery power pack 22 to recharge the battery power pack 22 under certain vehicle operating conditions, such as during a regenerative braking mode.

The powertrain 12 includes a power inverter 34 operable to convert the direct current from the battery power pack 22 to multi-phase alternating current required to drive the brushless electric starter motor M. The power inverter 34 may be included in a module with a motor controller 36 that is included in the electronic control system 29 of the powertrain 12. The powertrain 12 does not include a DC-DC converter connected between the battery power pack 22 and the power inverter 34, as the brushless electric starter motor M is the same voltage as the nominal voltage level as the battery power pack 22 which, in the embodiment shown, is 12 Volts.

An electric pinion solenoid S is operatively connected to the powertrain controller 27 and has an energized state and a deenergized state. A pinion gear 42 is configured to be rotatably driven by the brushless electric starter motor M and movable between a disengaged position shown in FIG. 1, in which the pinion gear 42 is disengaged from a ring gear 44, and an engaged position shown in phantom as 42A in which teeth of the pinion gear 42 are meshingly engaged with teeth of the ring gear 44 that is mounted to rotate with the crankshaft 14 (such as by mounting the ring gear 44 to a flywheel or flex plate of the engine E) to transfer torque provided from the brushless electric starter motor M to the crankshaft 14. In the embodiment shown, the pinion gear 42 is in the disengaged position shown in FIG. 1 when the solenoid S is in the deenergized state, and is in the engaged position when the solenoid S is in the energized state. The solenoid S may receive electric power from the battery power pack 22 causing a piston within the solenoid S to move a lever L that causes the pinion gear 42 to move to the engaged position 42A in FIG. 1. An overrunning one-way clutch 43 may be operatively disposed between the output shaft 60 and the pinion gear 42 and configured such that, if the ring gear 44 tries to back drive the pinion gear 42 once the engine E starts running and with the pinion gear 42 in the engaged position 42A, the pinion gear 42 will freewheel and will not back drive the brushless electric starter motor M to higher speeds, so that the brushless electric starter motor M is not damaged by excessive induced voltages. The one-way clutch 43 is attached to the pinion gear 42 and is axially slidable along the shaft 60 with the pinion gear 42 during engagement of the pinion gear 42 with the ring gear 44.

In order to reduce rotational speed and increase torque from the brushless electric starter motor M to the pinion gear 42, the starter system 61 may include gear reduction such as through a planetary gear set 50 that includes a sun gear 52 mounted to and rotating at the same speed as a motor shaft 54 of the brushless electric starter motor M, a ring gear 58 (i.e., an internal ring gear) that may be grounded, and a carrier 56 supporting a plurality of pinion gears 57 that mesh with the sun gear 52 and the ring gear 58. The carrier 56 is connected to rotate with a shaft extension 60 that is coaxial with the motor shaft 54, and on which the pinion gear 42 and overrunning one-way clutch 43 are axially slidable in response to energizing and deenergizing of the pinion solenoid S as discussed herein. The brushless electric starter motor M, the power inverter 34, the motor controller 36, the pinion solenoid S, the pinion gear 42, the overrunning one-way clutch 43, the shaft 54, the shaft extension 60, and the components of the reduction planetary gear set 50 are included in the starter system 61.

The electronic control system 29 is shown with two separate controllers: the powertrain controller 27 and the motor controller 36. Although the powertrain controller 27 and the motor controller 36 are shown as separate controllers, in some embodiments, they may be integrated. Additionally, the powertrain controller 27 may also be any one of, an integrated combination of, or may be operatively connected to additional controllers included in the powertrain control system 29, such as an engine controller and/or a transmission controller. Each of the controllers 27, 36 has a requisite memory and a processor, as well as other associated hardware and software, e.g., a clock or timer, input/output circuitry, etc. In an embodiment, the memory may include sufficient amounts of read only memory, for instance magnetic or optical memory. For example, instructions embodying the method 100 may be programmed as computer-readable instructions into the memory of and executed by the processor of the powertrain controller 27 during operation of the vehicle 10.

The motor controller 36 may be operatively connected to the powertrain controller 27 and responsive to electronic control signals configured to command the motor controller 36 to enable power flow from the battery power pack 22 as direct current through the power inverter 34 which converts the current to alternating current provided to the brushless electric starter motor M. The powertrain controller 27 receives vehicle and engine operating parameters 40 such as accelerator and brake pedal position information (or equivalent information related to acceleration demand such as when not input by such pedals, such as in an autonomous vehicle), vehicle speed, engine speed, the state of charge of the battery power pack 22, and the status of relatively high vehicle loads such as air conditioning, etc. The powertrain controller 27 is further in communication with the the engine E, and the pinion solenoid S. As shown, the powertrain controller 27 receives engine operating conditions from various sensors on the engine E. The powertrain controller 27 is separately in signal communication with the pinion solenoid S and the motor controller 36 as indicated by separate control lines L1 and L2. The powertrain controller 27 is configured to command the motor controller 36 to energize the brushless electric starter motor M using power from the battery power pack 22 through the power inverter 34, and to separately command the solenoid S to the enabled state to engage the pinion gear 42. This enables quick response time of the powertrain 12 during an autostop event and/or a restart event as described herein, and enables a change-of-mind for an engine restart without requiring a second solenoid to energize the motor M.

The electronic control system 29 is configured to control the powertrain 12 according to the method 100 which includes carrying out an engine restart event in which the engine E may be restarted during the drive mode using the brushless electric starter motor M following an autostop event. In the drawings, "Y" represents an affirmative answer to a query, and "N" represents a negative answer.

Figure 2:
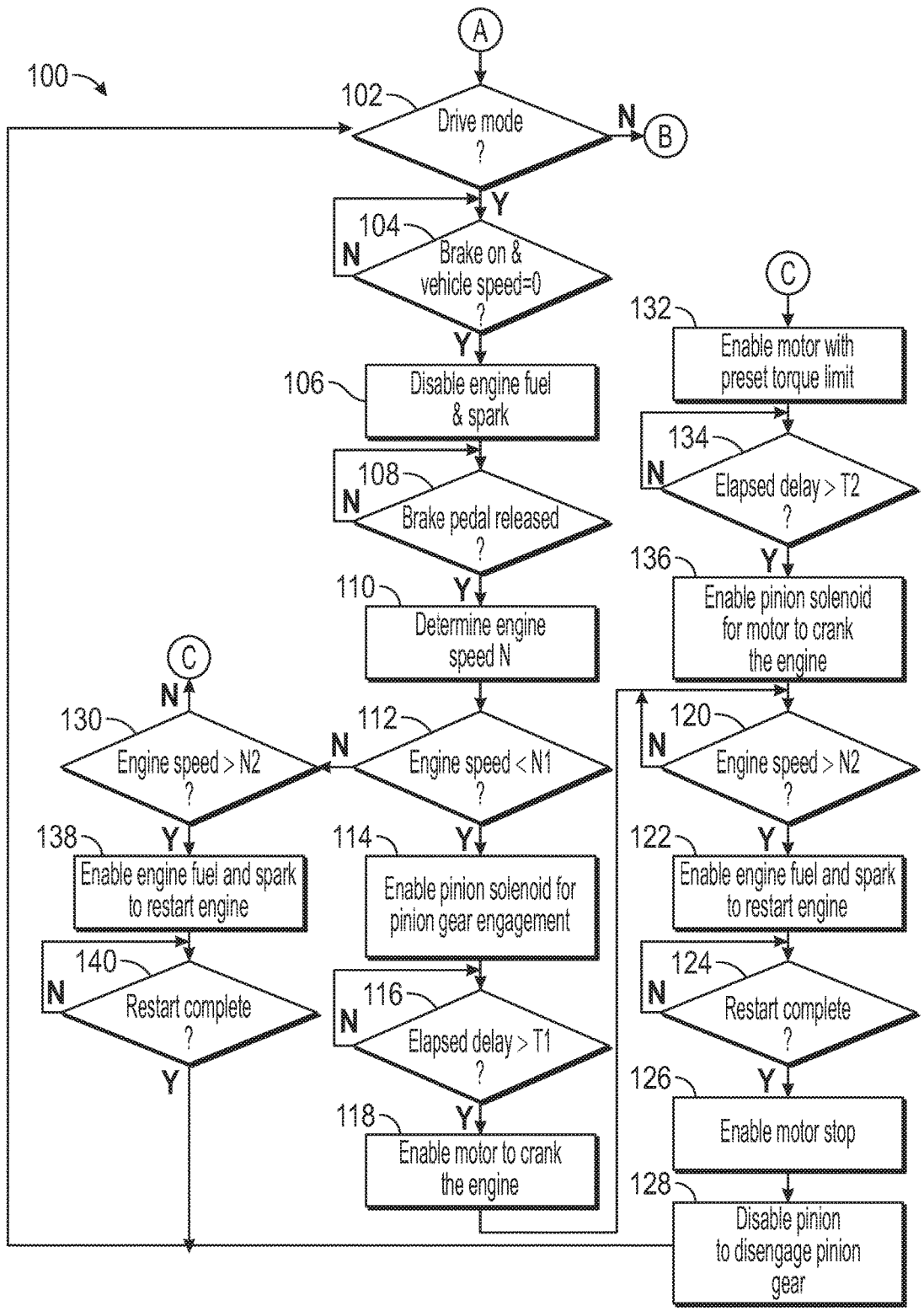
FIG. 2 is a schematic flow diagram of a method of controlling the starter system of FIG. 1, including an engine restart function.

Referring to FIG. 2, the method 100 begins at start A, and moves to step 102 in which the powertrain controller 27 determines whether the vehicle 10 is in the drive mode. In the vehicle 10 is not in the drive mode, then the method 100 does not proceed and ends at step B. Stated differently, the autostop function and engine restart function need not be and are not carried out by the electronic controller system 29 if the vehicle 10 is not in the drive mode.

If the vehicle 10 is in the drive mode, then the method 100 proceeds to step 104, in which the powertrain controller 27 determines whether the vehicle brake is on and the vehicle speed is zero. If the vehicle brake is on, such as if a brake pedal is depressed or, in an autonomous vehicle without a brake pedal, the equivalent controls are braking the vehicle 10, and the vehicle speed is also zero, such as may be determined by wheel speed sensors, then the method 100 proceeds to step 106, and the powertrain controller 27 commands an engine autostop which disables fuel and spark to the internal combustion engine E to accomplish an autostop event.

During the drive mode and following the engine autostop event accomplished in step 106, the powertrain controller 27 receives vehicle operating parameters satisfying one or more preset initial conditions for an engine restart event. For example, in step 108, the powertrain controller 27 determines whether the brake pedal (or its equivalent in an autonomous vehicle) is released. Release of the brake pedal is one vehicle operating parameter that may be indicative of the need for an imminent engine restart.

Following step 108, the method 100 proceeds to step 110, in which the powertrain controller 27 determines the engine speed (i.e., the rotational speed of the crankshaft 14). Crankshaft speed may be determined by rotational speed sensors or may be estimated from other engine data. The remainder of the method 100 carried out to restart the engine E is dependent upon the engine speed determined in step 110. More specifically, a first set of steps are carried out if the engine speed is less than a first predetermined speed threshold N1, a second set of steps are carried out if the engine speed is greater than the first predetermined speed threshold N1 but less than a predetermined cranking cutoff speed N2, and a third set of steps are carried out if the engine speed is greater than the predetermined cranking cutoff speed N2. The method 100 is engine speed-dependent in this manner because engine cranking via the brushless electric starter motor M is only needed at relatively low speeds in order to overcome internal friction in the engine and draw air into the cylinders sufficiently to allow the combustion process to cause the crankshaft 14 to turn once fuel and spark are introduced. For example, in a nonlimiting example, a predetermined cranking cutoff speed N2 may be a speed from 350 rpm to 400 rpm. Moreover, when engine cranking is needed, at very low speeds (i.e., speeds less than a first predetermined speed threshold N1, which is less than the cranking cutoff speed N2), the pinion gear 42 must be engaged before the brushless electric starter motor M is enabled as the full torque of the motor will be needed to crank the engine E from such low speeds. In a nonlimiting example, the first predetermined speed threshold N1 may be 125 to 150 rpm. Finally, at engine speeds greater than or equal to the first predetermined speed threshold N1 but less than or equal to the predetermined cranking cutoff speed N2, engine speeds are low enough that some cranking is needed, but the brushless electric starter motor M needs to be rotating at some speed prior to engaging the pinion gear 42 in order for a smooth engagement due to the speed of the engine E.

For example, at relatively low engine speeds, the pinion gear 42 is engaged first and then the brushless electric starter motor M is used to crank the engine E prior to enabling fuel and spark in the engine E. More specifically, in step 112, the powertrain controller 27 determines whether the engine speed is less than the first predetermined speed threshold N1. If the engine speed is less than the first predetermined speed threshold N1, then the method 100 proceeds to step 114 and the powertrain controller 27 commands the solenoid S to the enabled state to move the pinion gear 42 into engagement with the engine ring gear 44.

The method 100 then proceeds to step 116, in which the powertrain controller 27 sets a timer for a predetermined period of time T1 after commanding the solenoid S to the enabled state. This ensures that the pinion gear 42 is fully engaged with the engine ring gear 44, and allows a period of time for a change of mind regarding the engine restart to occur. Upon expiration of the predetermined period of time T1, the method 100 proceeds to step 118 in which the powertrain controller 27 commands the motor controller 36 to enable the brushless electric starter motor M to crank the internal combustion engine E by providing power from the battery power pack 22 to the brushless electric starter motor M through the power inverter 34.

The method 100 then proceeds to step 120, in which the powertrain controller 27 determines whether the engine speed is greater than the predetermined cranking cutoff speed N2. If the engine speed is not greater than the predetermined cranking cutoff speed N2 in step 120, the method 100 allows the brushless electric starter motor M to continue cranking the engine E. Only once the engine speed is greater than the predetermined cranking cutoff speed N2 in step 120 does the method 100 proceed to step 122, in which the powertrain controller 27 enables fuel as well as spark to the engine E to restart the engine E.

In step 124, the powertrain controller 27 monitors engine operating parameters 40 such as crankshaft rotational speed, amount of fuel dispensed in the cylinders, and time elapsed, and determines when the engine operating parameters meet predefined threshold values indicative of a complete engine restart. For example, a complete engine restart may be defined as a rotational speed of the crankshaft 14 of greater than or equal to 500 rpm sustained for a predefined amount of time following enablement of the brushless electric starter motor M, and a predefined volume of fuel dispensed.

Following satisfaction of the predetermined threshold values indicative of a complete engine restart in step 124, the method 100 proceeds to step 126 in which the powertrain controller 27 commands the motor controller 36 to cease energizing of the brushless electric starter motor M (i.e., enables a motor stop), and then to step 128 in which the powertrain controller 27 commands the pinion solenoid S to the disabled state to disengage the pinion gear 42 from the engine ring gear 44. The method 100 then exits the engine restart function and returns to step 102.

However, if the powertrain controller 27 determines in step 112 that the engine speed is not less than the first predetermined speed threshold N1 (i.e., is greater than or equal to the first predetermined speed threshold N1), then instead of proceeding from step 112 to step 114, the method 100 proceeds to step 130, in which the powertrain controller 27 determines whether the engine speed is greater than the predetermined cranking cutoff speed (N2). If the powertrain controller 27 determines in step 130 that the engine speed is not greater than the predetermined cranking cutoff speed N2 (i.e., is less than or equal to predetermined cranking cutoff speed N2), then the method 100 proceeds from step 130 to step 132 (as indicated by block C in FIG. 2 repeated at the top of step 132).

In step 132, the powertrain controller 27 commands the motor controller 36 to enable the brushless electric starter motor M with a preset torque limit. The method 100 then proceeds to step 134, in which the powertrain controller 27 sets a timer for a predetermined period of time T2 after commanding the motor controller 36 to enable the brushless electric starter motor M with the preset torque limit to crank the internal combustion engine E by providing power from the battery power pack 22 to the brushless electric starter motor M through the power inverter 34. This ensures that the brushless electric starter motor M is able to reach a speed that will enable the pinion gear 42 to seamlessly mesh with the engine ring gear 44.

Accordingly, upon expiration of the predetermined period of time T2, the method 100 proceeds to step 136 in which the powertrain controller 27 commands the solenoid S to the enabled state to move the pinion gear 42 into engagement with the engine ring gear 44 to crank the engine E (i.e., enables the pinion solenoid S in order to crank the engine E with the brushless electric starter motor M). Following step 136, the method 100 proceeds to step 120, and completes steps 120, 122, 124, 126, and 128 as described above.

However, if the powertrain controller 27 determines in step 130 that the engine speed is greater than the predetermined cranking cutoff speed N2, then instead of proceeding to step 122, the method 100 proceeds from step 130 to step 138 in which the powertrain controller 27 enables fuel to the engine E as well as spark to restart the engine E. The pinion solenoid S and the brushless electric starter motor M are not enabled. The brushless electric starter motor M is not used to crank the engine E when the engine speed is greater than the predetermined cranking cutoff speed N2. At such an engine speed, the engine E does not need cranking, and fuel and spark alone will restart the engine E.

Following step 138, the method 100 proceeds to step 140, in which the powertrain controller 27 monitors engine operating parameters 40 such as crankshaft rotational speed, amount of fuel dispensed in the cylinders, and time elapsed since enablement of the brushless electric starter motor 61, and determines when the engine operating parameters meet predefined threshold values indicative of a complete engine restart, as in step 124. The method 100 then exits the engine restart function and returns to step 102.

Figure 3:
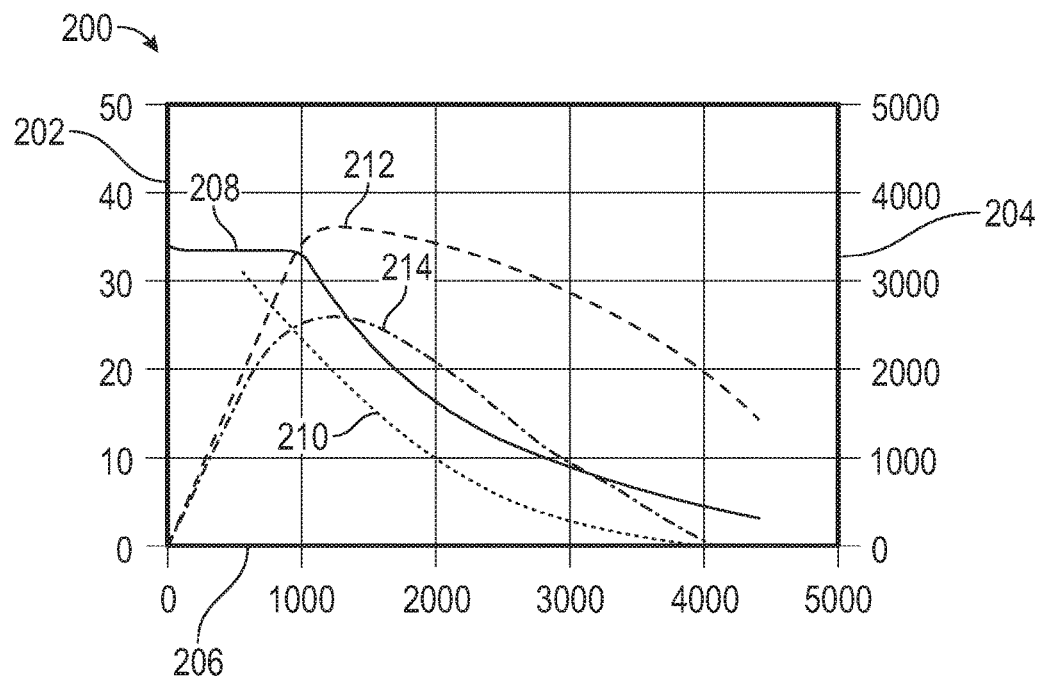
FIG. 3 is a schematic illustration of a plot of torque (Newton meters) on the left vertical axis and power (Watts) on the right vertical axis versus rotational speed for exemplary brush-type and brushless starter systems.

In FIG. 3, plot 200 depicts the performance of a pair of exemplary electric motors having a nominal voltage of 12 Volts, including a brush-type electric motor and the brushless electric starter motor M of the present disclosure. The left vertical axis 202 represents torque at the output shaft 60 in Newton-meters of the respective motor when cranking the engine E. The right side vertical axis 204 represents power in Watts provided by the respective motor when cranking the engine E. The horizontal axis 206 represents rotational speed of the respective motor in revolutions per minute (rpm) at the output shaft 60. Curve 208 represents torque provided to the engine E by the brushless electric starter motor M. Curve 210 represents torque provided to the engine E by the exemplary brush-type motor. The brushless electric starter motor M provides a relatively constant torque to the engine E over a wider speed range than does the brush-type motor. For example, from about 0 to 1000 rpm, the brushless electric starter motor M provides a relatively constant output torque of about 34 N-m at the output shaft 60.

Power applied to the engine E is also improved with the brushless electric starter motor M relative to the brush-type motor. Curve 212 represents the cranking power applied by the brushless electric starter motor M while curve 214 represents the cranking power applied by the brush-type motor. The brushless electric starter motor provides approximately 1000 W greater peak power than the brush-type motor (approximately 3600 Watts versus 2600 Watts). Additionally, power from the brush-type motor falls to zero at about 4000 rpm, while the brushless electric starter motor M provides power over a wider speed range and at significantly higher speeds.

Figure 4:
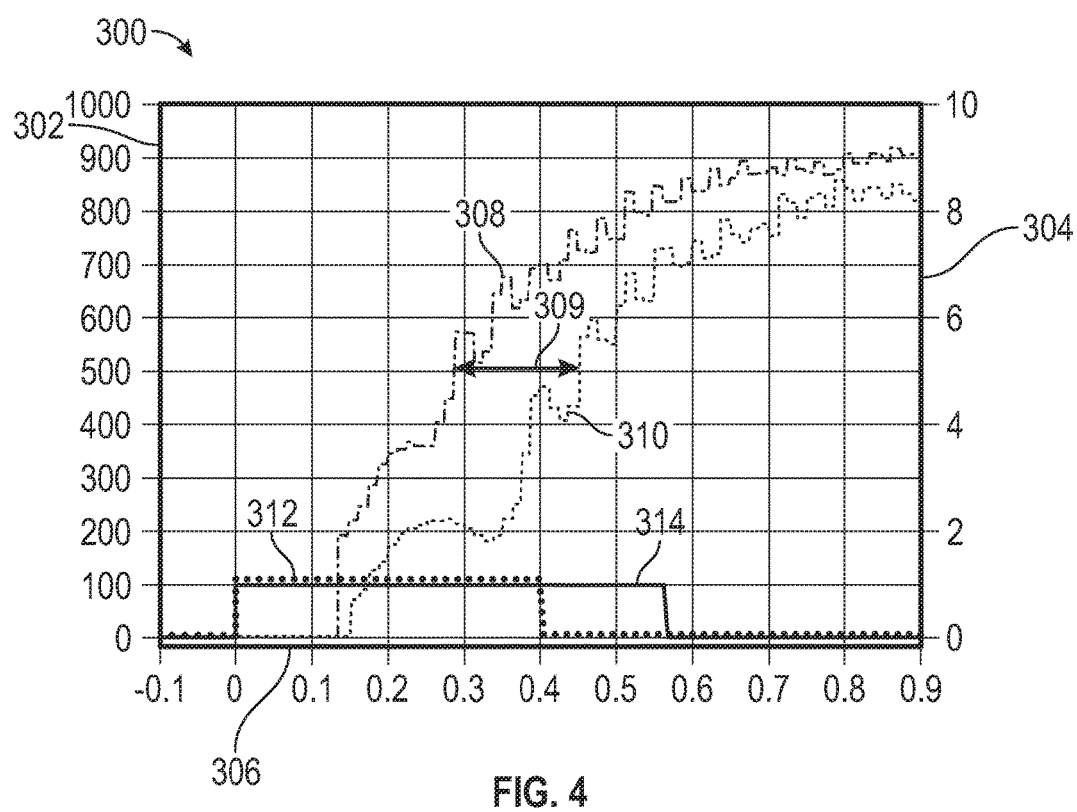
FIG. 4 is a schematic illustration of a plot of engine speed (revolutions per minute) on the left vertical axis and an on/off motor enable command on the right vertical axis versus time (seconds) on the horizontal axis for exemplary brush-type and brushless starter motors.

In FIG. 4, plot 300 compares the engine speed during engine autostart when a representative 2.0-liter engine is cranked by the same pair of electric motors described with respect to the plot 200 of FIG. 3. The left vertical axis 302 represents engine speed in rpm of the engine E. The right side vertical axis 304 represents an on/off motor enable command signal with 1 representing "on" (i.e., enable) and 0 representing "off" (i.e., disable). The horizontal axis 306 represents time in seconds. Curve 308 represents the engine speed of the brushless electric starter motor M. Curve 310 represents the engine speed of the brush-type motor. Curve 312 represents the motor enable command to the brushless electric starter motor M. Curve 314 represents the motor enable command to the brush-type motor. Curve 312 is raised slightly above the "on" level for visibility in FIG. 4, but falls at the same level as curve 314 when the motor enable command is on.

As can be seen in plot 300, the engine speed increases faster when the engine E is cranked by the brushless electric starter motor M than when cranked by the brush-type motor. For example, the engine speed reaches 500 rpm at about 0.28 seconds after the motor enable command is set to "on" (i.e., a value of 1 in the plot 300) when cranked by the brushless electric starter motor M, but does not reach 500 rpm until about 0.45 seconds when cranked by the brush-type motor. The time difference is indicated at 309. Additionally, the engine E is at a higher speed at any given time after the motor enable command is set to "on" with the brushless electric starter motor M than with the brush-type motor over the time range shown (to 0.9 seconds).

Accordingly, the brushless electric starter motor M and the method 100 of controlling a starter system 61 to restart the engine E using the brushless electric starter motor M as described herein can provide numerous efficiency and performance advantages.

While the best modes for carrying out the disclosure have been described in detail, those familiar with the art to which this disclosure relates will recognize various alternative designs and embodiments for practicing the disclosure within the scope of the appended claims.

What is claimed is:

1. A starter system for use with a powertrain having an internal combustion engine with a ring gear operatively connected to a crankshaft of the internal combustion engine, the starter system comprising:
   a brushless electric starter motor selectively operatively connectable to the internal combustion engine;
   a battery power pack;
   a power inverter operable to convert direct current provided from the battery power pack to multi-phase alternating current to drive the brushless electric starter motor;
   a pinion gear configured to be rotatably driven by the brushless electric starter motor and movable between a disengaged position in which the pinion gear is disengaged from the ring gear, and an engaged position in which the pinion gear is meshingly engaged with the ring gear to transfer torque provided from the brushless electric starter motor to the crankshaft;
   a solenoid operatively connected to the pinion gear;
   an electronic control system operable to control the brushless electric starter motor to crank the internal combustion engine using power provided from the battery power pack through the power inverter, and to separately command the solenoid to a disabled state and alternately to an enabled state, wherein the pinion gear moves to the disengaged position when the solenoid is in the disabled state, and moves to the engaged position when the solenoid is in the enabled state;

wherein the electronic control system includes a timer, and the electronic control system is operable to set the timer for a predetermined period of time after commanding the solenoid to the enabled state; and wherein controlling the brushless electric starter motor to crank the internal combustion engine is upon expiration of the predetermined period of time.

2. The starter system of claim 1, wherein:

the electronic control system includes a powertrain controller and a motor controller; and the powertrain controller is configured to command the motor controller to energize the brushless electric starter motor using power from the battery power pack through the power inverter, and to separately command the solenoid to the enabled state to engage the pinion gear.

3. The starter system of claim 1, further comprising:

a power bus connecting the battery power pack to the power inverter and the brushless electric starter motor, and also connecting the battery power pack to vehicle electrical loads.

4. The starter system of claim 1, wherein the battery power pack is the only electrical power source for supplying electrical power to the powertrain.

5. The starter system of claim 1, wherein the starter system is characterized by the absence of a DC-DC converter operatively connecting the battery power pack to the power inverter.

6. The starter system of claim 1, wherein the electronic control system is configured to determine engine speed of the internal combustion engine;

wherein the engine speed is equal to a rotational speed of the crankshaft; and during a drive mode following an engine autostop event and only if the engine speed is less than or equal to a predetermined cranking cutoff speed (N2), the electronic control system enables the brushless electric starter motor to crank the internal combustion engine using power provided from the battery power pack.

7. The starter system of claim 6, wherein:

only if engine speed is less than a first predetermined speed threshold (N1), the electronic control system is configured to both: (i) command the solenoid to the enabled state to move the pinion gear into engagement with the ring gear, and (ii) after commanding the solenoid to the enabled state, enable the brushless electric starter motor to crank the internal combustion engine during the drive mode following the engine autostop event; and the first predetermined speed threshold is less than the predetermined cranking cutoff speed (N2).

8. The starter system of claim 7, wherein, after commanding the solenoid to the enabled state to move the pinion gear into engagement with the ring gear, and only if the engine speed is greater than the predetermined cranking cutoff speed (N2), the electronic control system is configured to enable fuel and spark to restart the internal combustion engine.

9. The starter system of claim 6, wherein, after the engine autostop event and only if the engine speed is greater than the predetermined cranking cutoff speed (N2), the electronic control system is configured to restart the internal combustion engine by enabling fuel and spark without enabling the brushless electric starter motor and without commanding the solenoid to the enabled state.

10. The starter system of claim 6, wherein, when the engine speed is greater than or equal to a first predetermined speed threshold (N1) and less than or equal to the predetermined cranking cutoff speed (N2), the electronic control system is configured to both: (i) enable the brushless electric starter motor with a preset torque limit; and (ii) after enabling the brushless electric starter motor, command the solenoid to the enabled state to move the pinion gear into engagement with the ring gear to crank the internal combustion engine.

11. The starter system of claim 10, wherein, after commanding the solenoid to the enabled state, the electronic control system is configured to both: (i) determine whether the engine speed is greater than the predetermined cranking cutoff speed (N2), and (ii) enable fuel and spark to restart the internal combustion engine only if the engine speed is greater than the predetermined cranking cutoff speed (N2).

12. The starter system of claim 11, wherein, after enabling fuel and spark to restart the internal combustion engine, the electronic control system is configured to:

monitor one or more engine operating parameters;

determine when the one or more engine operating parameters meet one or more predefined values indicative of a complete engine start;

cease energizing of the brushless electric starter motor when the one or more engine operating parameters meet the predefined values; and command the solenoid to the disabled state to disengage the pinion gear from the ring gear when the one or more engine operating parameters meet the one or more predefined values.

13. A method of controlling a starter system for a powertrain, the method comprising:

during a drive mode and following an engine autostop event, receiving, via an electronic control system, vehicle operating parameters satisfying one or more preset initial conditions for an engine restart event;

wherein the powertrain includes an internal combustion engine, and an engine ring gear connected with a crankshaft of the internal combustion engine;

wherein the starter system includes a brushless electric starter motor selectively operatively connectable to the internal combustion engine, a battery power pack, a pinion gear, and a solenoid;

determining, via the electronic control system, an engine speed, wherein the engine speed is a rotational speed of the crankshaft;

controlling the brushless electric starter motor to crank the internal combustion engine using power provided from the battery power pack only if the engine speed is less than a predetermined cranking cutoff speed (N2);

only if the engine speed is less than a first predetermined speed threshold (N1) that is less than the predetermined cranking cutoff speed (N2):

commanding the solenoid to an enabled state to move the pinion gear into engagement with the engine ring gear; and after commanding the solenoid to the enabled state, setting a timer for a predetermined period of time, and upon expiration of the predetermined period of time, enabling the brushless electric starter motor to crank the internal combustion engine during a vehicle drive mode following the engine autostop event.

14. The method of claim 13, further comprising:
after the commanding the solenoid to the enabled state, and only if the engine speed is greater than the predetermined cranking cutoff speed (N2), enabling fuel and spark to restart the internal combustion engine.

15. The method of claim 13, further comprising:
only if the engine speed is greater than the predetermined cranking cutoff speed (N2), enabling fuel and spark to the internal combustion engine to restart the internal combustion engine without controlling the brushless electric starter motor to crank the internal combustion engine.

16. The method of claim 13, further comprising, if the engine speed is greater than or equal to a first predetermined speed threshold (N1) and less than or equal to the predetermined cranking cutoff speed (N2):
enabling the brushless electric starter motor with a preset torque limit; and
after enabling the brushless electric starter motor with the preset torque limit, commanding the solenoid to an enabled state to move the pinion gear into engagement with the engine ring gear to crank the internal combustion engine.

17. The method of claim 16, further comprising:
after commanding the solenoid to the enabled state:
determining whether the engine speed is greater than the predetermined cranking cutoff speed; and
enabling fuel and spark to restart the internal combustion engine only if the engine speed (N2) is greater than the predetermined cranking cutoff speed (N2).

18. The method of claim 17, further comprising:
determining whether engine restart is complete by comparing engine operating parameters to predetermined engine operating parameters indicative of a complete engine restart;
if engine restart is complete:
disabling the brushless electric starter motor so that it will to come to stop; and
disabling the solenoid to disengage the pinion gear from the engine ring gear.

* * * * *